United States Patent
Cermak

(10) Patent No.: US 11,384,797 B2
(45) Date of Patent: Jul. 12, 2022

(54) DRIVE SHAFT CONNECTION

(71) Applicant: GKN Driveline Deutschland GmbH, Offenbach (DE)

(72) Inventor: Herbert Cermak, Bessenbach (DE)

(73) Assignee: GKN Driveline Deutschland GmbH, Offenbach (DE)

( * ) Notice: Subject to any disclaimer, the term of this patent is extended or adjusted under 35 U.S.C. 154(b) by 368 days.

(21) Appl. No.: 16/604,630

(22) PCT Filed: Apr. 25, 2017

(86) PCT No.: PCT/EP2017/059788
§ 371 (c)(1),
(2) Date: Oct. 11, 2019

(87) PCT Pub. No.: WO2018/196960
PCT Pub. Date: Nov. 1, 2018

(65) Prior Publication Data
US 2020/0132124 A1    Apr. 30, 2020

(51) Int. Cl.
F16D 1/064    (2006.01)
F16C 3/02    (2006.01)
F16D 1/08    (2006.01)

(52) U.S. Cl.
CPC ............. *F16D 1/064* (2013.01); *F16C 3/023* (2013.01); *F16D 1/0852* (2013.01); *F16C 2204/20* (2013.01); *F16C 2204/60* (2013.01)

(58) Field of Classification Search
CPC .. F16C 3/023; F16C 2204/20; F16C 2204/60; F16D 1/064; F16D 1/072; F16D 1/0852;
(Continued)

(56) References Cited

U.S. PATENT DOCUMENTS 4,380,443 A    4/1983 Federmann et al.
4,807,351 A    2/1989 Berg et al.
(Continued)

FOREIGN PATENT DOCUMENTS

DE    2728306 A1    1/1978
DE    3007896 A1    9/1981
(Continued)

OTHER PUBLICATIONS

Specification Translation of DE 198 53 798. Jurr, et al. Connection between two shafts is a sleeve pushed over the teeth or splines at the shaft ends in a press fit with malleable distortion to mold round the teeth/splines in a keyed and positive fit. Sep. 21, 2000.*
(Continued)

*Primary Examiner* — Josh Skroupa
(74) *Attorney, Agent, or Firm* — Bejin Bieneman PLC

(57) ABSTRACT

A shaft connection, e.g., for a motor vehicle driveline, comprises a metal shaft tube material and a metal connecting element. The connecting element comprises a connecting portion with an outer toothing which is pressed with a press fit into a connecting portion of the shaft tube so that an interlocking connection effective in the circumferential direction is formed for torque transmission, wherein the connecting element comprises a maximum outer diameter in the region of the outer toothing; wherein the shaft tube comprises an axial connecting region which is formed radially inwardly into a section of the connecting portion that is reduced relative to the outer toothing so that an interlocking axial connection effective in the axial direction is formed between the shaft tube and the connecting element for transmitting axial forces. A drive shaft can have such a shaft connection.

13 Claims, 10 Drawing Sheets

(58) Field of Classification Search
CPC ......... Y10T 403/4966; Y10T 403/4974; Y10T 403/7026; Y10T 403/7033; Y10T 403/7035
USPC .............. 403/282, 283, 359.1, 359.5, 359.6; 464/182, 183
See application file for complete search history.

(56) References Cited

U.S. PATENT DOCUMENTS

| | | | | |
|---|---|---|---|---|
| 5,118,214 | A * | 6/1992 | Petrzelka | F16C 3/026 403/267 |
| 6,892,929 | B2 * | 5/2005 | Yablochnikov | F16D 1/068 228/115 |
| 7,074,129 | B2 * | 7/2006 | Sugiyama | F16D 1/072 464/182 |
| 10,550,978 | B2 * | 2/2020 | Kawahara | F16D 1/072 |
| 2002/0041790 | A1 * | 4/2002 | Suzuki | F16D 1/072 403/280 |
| 2002/0195291 | A1 * | 12/2002 | Nonogaki | F16D 1/072 180/337 |
| 2003/0157988 | A1 * | 8/2003 | Nonogaki | F16D 1/072 464/181 |
| 2006/0131300 | A1 * | 6/2006 | Yablochnikov | F16D 1/068 219/617 |
| 2016/0167907 | A1 * | 6/2016 | Meyer | B65H 19/30 242/533 |

FOREIGN PATENT DOCUMENTS

| | | | |
|---|---|---|---|
| DE | 4325963 | A1 | 2/1995 |
| DE | 19853798 | C1 | 9/2000 |
| DE | 19943880 | C1 | 6/2001 |
| DE | 4111286 | B4 * | 10/2005 ............ F16D 1/072 |
| DE | 102013103769 | B3 * | 10/2014 ............ F16D 1/072 |
| DE | 102014002731 | A1 | 9/2015 |
| EP | 0109451 | A1 | 5/1984 |
| GB | 1330313 | A | 9/1973 |
| JP | 2003254318 | A | 9/2003 |
| WO | 87/05369 | A1 | 9/1987 |

OTHER PUBLICATIONS

International Search Report and Written Opinion for PCT/EP2017/059788 dated Jan. 25, 2018 (15 pages; with English translation).

* cited by examiner

DRIVE SHAFT CONNECTION

CROSS-REFERENCE TO RELATED APPLICATION

This application is a national stage of, and claims priority to, Patent Cooperation Treaty Application No. PCT/EP2017/059788, filed on Apr. 25, 2017, which application is hereby incorporated herein by reference in its entirety.

BACKGROUND

When designing drive shafts in motor vehicles, it is not only the requirements during normal operation that must be taken into account, but also their behaviour in the event of a crash. For certain applications, there is a design requirement that the drive shaft can shorten axially in the event of a crash in order to prevent buckling and penetration into the passenger cell.

From DE 199 43 880 C1 a propeller shaft is known which is designed as a crash-capable drive shaft. For this purpose, the propeller shaft has a first shaft section and a second shaft section which are connected to each other via a constant velocity joint. The ball cage of the constant velocity joint is designed to have a predetermined breaking point. An accidental shortening of the drive shaft is realized in that the first shaft section, guided by the outer part of the broken constant velocity joint, can be telescopically pushed into the shaft tube of the second shaft section.

From DE 43 25 963 A1 a shaft connection is known for the transmission of torque between a hollow shaft made of aluminium material and a connecting journal that is inserted into the open end of the hollow shaft and fixed to a connecting element. The connecting journal is pressed into the hollow shaft with a press fit, wherein the hollow shaft is surrounded in the press-in region by a support and fastening ring made of steel. The length of the support and fastening ring on the hollow shaft is greater than the length of the press-in region of the connecting journal in the hollow shaft. This means that energy is absorbed in the form of deformation work and friction when axial force is applied in the event of a crash along an increased displacement path.

From DE 30 07 896 A1 the connection is known between a connecting flange with outer toothing and a shaft tube into which the connecting flange is pressed. The shaft tube is designed as a fibre composite plastic tube.

From U.S. Pat. No. 4,807,351 B a procedure for connecting a joint yoke to a shaft tube is known. For this purpose, a reinforcing ring is first shrunk onto the shaft tube using a forming tool, creating a wave-like contour. After pulling the forming tool, the joint yoke is then pressed into the end portion of the shaft tube provided with a reinforcing ring. The joint yoke has a flange-shaped shoulder which comes into axial contact with the end portion of the shaft tube.

SUMMARY

The present disclosure relates to a shaft connection for a drive shaft, in particular for a driveline of a motor vehicle, and a drive shaft with such a shaft connection. An improved crash-capable shaft connection for a drive shaft can safely transmit a defined axial force and/or absorb it without damage. A corresponding drive shaft with such a shaft connection has a defined crash behaviour.

A shaft connection, in particular for a driveline of a motor vehicle, comprises: a shaft tube made of a metal material; a connecting element made of a metal material, wherein the connecting element has a journal connecting portion with an outer toothing which is pressed into a tube connecting portion of the shaft tube with a press fit, wherein an interlocking connection effective in the circumferential direction is formed between the shaft tube and the connecting element for torque transmission, wherein the connecting element has a largest outer diameter in the region of the outer toothing; wherein the shaft tube comprises an axial connection section that is formed radially inwardly into a diameter-reduced section of the journal connecting portion with respect to the outer toothing, such that an interlocking axial connection effective in the axial direction is formed between the shaft tube and the connecting element for transmitting axial forces.

An advantage is that the shaft connection has improved crash properties. A first functional connection between the connecting element and the shaft tube is formed by the toothing engagement between the outer toothing of the connecting element and the counter toothing of the shaft tube produced by pressing-in. This first connecting means is effective substantially in the circumferential direction, i.e. forms a rotationally fixed connection for transmitting torque between the connecting element and the shaft tube. A second functional connection between the connecting element and the shaft tube is formed by the interlocking engagement between the shaft tube section formed into the diameter-reduced section. This second connecting means is effective substantially in the axial direction, i.e. forms an axial connection between the shaft tube and the connecting element. In the case of a smaller axial force acting on the shaft connection, for example due to a small impact of the motor vehicle, which can be absorbed by the bumper without significant damage to the motor vehicle, the shaft connection remains damage-free due to the second connecting means. The acting axial force is essentially absorbed, and/or transmitted by the second connecting means, i.e., the interlocking axial connection between the shaft tube and connecting element. In this case, the length of the shaft connection remains unchanged. The connecting element can be any force-transmitting element, for example a journal part, adapter part and/or joint part of a rotary joint. The connection element can also be referred to as a shaft journal or connecting journal.

The shaft tube can be formed into the reduced section of the connecting element by beading, for example. The reduced section of the connecting element can, for example, be formed by an annular groove in an outer surface of the connecting portion.

The axial holding force of the interlocking axial connection can be set to a defined value according to the needs and requirements on the shaft connection. The magnitude of the transmissible axial holding force can be adjusted, for example, by the wall thickness of the shaft tube in the area of the forming-in and/or the depth of the forming-in. For example, the interlocking axial connection can be designed in such a way that the shaft connection can absorb axial forces of up to 5 kN (kilo-Newtons) without damage. Only when the axial holding force is exceeded do the connecting element and the shaft tube move relative to each other, wherein the shaft connection can be extended and/or shortened. In this respect, the holding force can also be referred to as the starting force for the relative movement, and the axial connecting means can also be referred to as the starting force means.

For a reliable connection, an optional reinforcement ring can be used, which is pushed onto the shaft tube before the connecting element is pressed in. The reinforcement ring increases the strength of the connection between shaft tube and connecting element so that the connection can transmit higher forces and torques, and/or can withstand them.

According to a possible embodiment, the axial connecting means are effective in both axial directions, i.e., in the direction of the shaft tube and the connecting element towards and away from each other. In particular, the connecting portion of the connecting element may have two axially adjacent outer toothings, between which a circumferential annular groove is provided, into which the axial connecting section of the shaft tube is formed. The axial connection is formed by the form-fitting engagement of the shaft tube in the annular groove, wherein the tube section formed in the shaft tube is axially enclosed between the two outer toothings. In this way, the shaft tube is secured against the connecting element in both axial directions. The width of the annular groove can be smaller than the width of each of the two outer toothings. It is also possible, however, that the axial connecting means are designed so as to be effective only in one axial direction, i.e., towards or away from each other.

In the event that the axial holding force of the shaft connection is exceeded, for example as a result of an accident, the connecting element and the shaft tube can move telescopically relative to each other. Depending on the design of the shaft tube, the sliding and force behaviour of the shaft connection in the direction towards and/or away from each other can be adjusted according to the crash behaviour requirements.

For example, the shaft tube can have a substantially constant diameter at least in the tube section adjacent to the end section, possibly over the entire length of the shaft tube. In this case, the connecting element with its outer toothing is pressed further into the shaft tube due to the axial forces caused by the accident, wherein impact energy is absorbed due to the deformation work.

According to a further possibility, the shaft tube can also be stepped following the connecting portion. Specifically, the shaft tube can have a smaller diameter in the connecting portion connected to the connecting element than in a subsequent tube portion. With this design, in case of the shaft connection being shortened due to an accident, the toothings between the connecting element and the shaft tube are increasingly disengaged, so that the axial displacement force decreases accordingly over the displacement path. When the outer toothing of the connecting element has completely penetrated the connecting portion of the shaft tube, i.e., plunges into a tube portion with a larger diameter, the axial force drops to zero, so that further insertion of the connecting element into the shaft tube is substantially force-free.

According to an example, the outer diameter of the shaft tube is larger than the largest outer diameter of the connecting element. This ensures that in the event of a crash, the connecting element can completely plunge into the shaft tube, so that the shaft connection can achieve a large axial displacement.

It is provided that both the shaft tube and the connecting journal are made of a metallic material. In particular, the strength of the shaft tube may be less than the strength of the outer toothing. In this way, it is ensured that the outer toothing can be well formed into the shaft tube during press-forming in order to produce the counter toothing here. The connecting journal can be made of a steel material, in particular of a hardened steel, and the shaft tube of a light metal, for example aluminium. However, it is to be understood that the tube shaft can also be made of a steel material.

According to a first embodiment, the shaft tube can have a constant sheet thickness along its length. For example, the shaft tube can be made from a sheet metal that is formed into a tube and longitudinally welded along the butt edges. The length of the shaft tube is adapted to the respective application. The sheet thickness can be, for example, between 1.5 mm (millimeters) and 2.5 mm. According to an alternative embodiment, the shaft tube can have a variable sheet thickness over its length. This design offers the advantage that the geometry of the shaft tube can be adapted to the individual loads. In particular, one or both end portions of the shaft tube can be designed with a greater wall thickness than an intermediate tube portion. In this way, the end portion to be connected to the connecting element has a higher strength, so that a robust connection to the connecting element can optionally also be achieved without a reinforcement ring.

For all of the above embodiments, a reinforcement ring may be arranged on the outside of the end portion of the shaft tube to further increase stability. In particular, this may consist of a material with higher strength than the tube material.

According to an embodiment, the toothing between the connecting element and the shaft tube has an average diameter and an axial toothing length, wherein the ratio of the average diameter to the axial toothing length possibly being greater than 2.0, or greater than 2.5. Due to such a relatively narrow toothing, i.e., a small toothing length in relation to the diameter, the expenditure for producing the toothing is correspondingly low. In addition, a short design of the connection portion is achieved, which in turn has a positive effect on the weight of the shaft connection. In this context, it would be advantageous to limit the length of the toothing to that required for torque transmission. The toothing length refers in particular to the effective toothing length, i.e., the length of the teeth which effectively participate in torque transmission, i.e., which engage with the counter teeth of the shaft tube. In the case of two axially spaced toothings, the toothing length of the two toothings would have to be added together.

The shaft connection described herein can, for example, be part of a drive shaft for transmitting torque from a driving component to a component to be driven. Such a drive shaft accordingly has a first connecting element for being rotationally fixedly connected with a first component in the driveline and at the opposite end a second connecting element for being rotationally fixedly connected with a second component in the driveline. One or both connecting elements can, for example, be designed as shaft journals. For being rotationally fixedly connected with a connecting component, the shaft journal can have shaft splines at its free end for insertion into corresponding counter splines of the connecting component.

The solution to the above object is further a drive shaft with a shaft connection that has at least one of the above embodiments. At its opposite end to the connecting element, the drive shaft has a second connecting element which is fixedly connected to the second end portion of the shaft tube. The connection with the second connecting element can be, for example, a form-fit connection or a welded connection. The connecting element can, for example, be a shaft journal or an outer joint part of a constant velocity joint or a sleeve-shaped adapter element. The drive shaft may be, for example, part of a multi-part drive shaft, in particular a propeller shaft for the driveline of a multi-axle motor vehicle.

SUMMARY OF THE DRAWINGS

Example embodiments are explained below using the drawings, which show.

DESCRIPTION

Figure 1A:
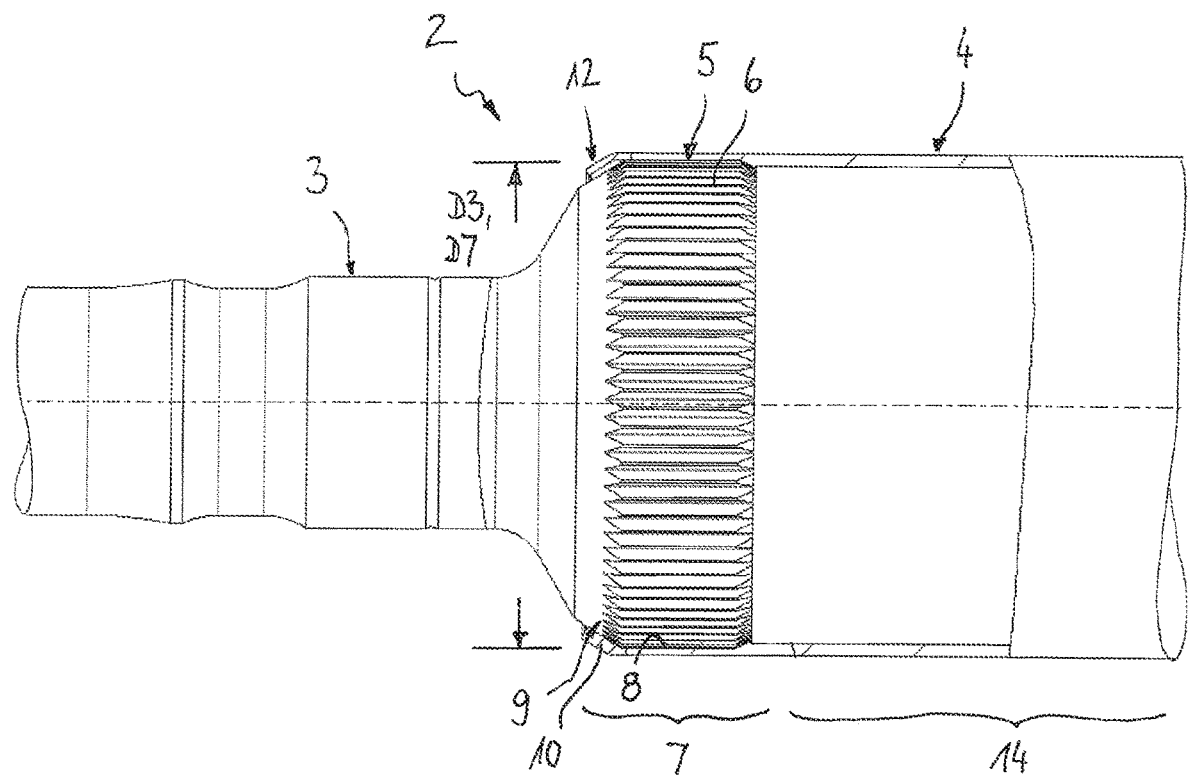
FIG. 1A: a shaft connection in a first embodiment in a partial longitudinal section.

FIGS. 1 to 16 are initially jointly described with regard to their similarities. A shaft connection 2, with a connecting element 3 and a shaft tube 4, form-fittingly connected to each other by a press connection, is shown. The shaft connection 2 may be part of a drive shaft for transmitting torque from a driven part to a part to be driven, for example in the driveline of a motor vehicle. The connecting element 3 serves to transmit torque to another torque-transmitting component in the driveline, such as an inner joint part or an outer joint part of a rotary joint.

Specifically, it is provided that the connecting element 3 comprises a connecting portion 5 with an outer toothing 6 which is pressed into the end portion 7 of the shaft tube 4 with a press fit. In this way, an interlocking connection effective in the circumferential direction is formed between the shaft tube 4 and the connecting element 3 for transmitting torque. The shaft tube 4 has a smooth, i.e., toothless, surface before the flange portion 7 is pressed in. Only by pressing in the connecting element 3 is the toothing on the inner wall of the shaft tube 4 produced.

The shaft tube 4 and the connecting element 3 are each made of a metallic material. The same or different materials can be used. According to an exemplary embodiment, the connecting element 3 can be made of a steel material, in particular of a hardenable steel, and the shaft tube 4 of a light metal, for example aluminium. Such a combination of materials, i.e. with a lower strength of the shaft tube than the outer toothing, allows the outer toothing 6 to be formed well into the shaft tube 4 during pressing-in in order to produce the counter toothing 8 here.

The connecting element 3 has a largest outer diameter D3 in the region of the outer toothing 6, and a reduced section 9 with a smaller diameter with respect to the outer toothing 6. The shaft tube 4 has an axial connecting portion 10, which is formed radially inwardly into the reduced section 9 of the flange portion 7 and axially supported against a supporting face 13 of the connecting element 3. In this way, an interlocking axial connection is formed between the shaft tube 4 and the connecting element 3 in the axial direction for the transmission of axial forces. The shaft tube 4 can be formed into the reduced portion 9 of the connecting element 3, for example, by crimping or beading the axial connecting portion 10 radially inwardly. The axial holding force of the interlocking axial connection can be designed according to the technical requirements of the shaft connection. For example, the shaft connection can be designed such that axial forces up to a certain value can be absorbed without damaging the shaft connection, and/or the drive shaft. Only when the axial holding force is exceeded does the connecting element 3 penetrate into the shaft tube 4, thereby shortening the shaft connection 2.

The shaft tube 4 can have a constant sheet thickness over its length, as shown in FIGS. 1 to 16. The sheet thickness can be between 1.5 mm and 2.5 mm, for example. The length of the shaft tube is adapted to the respective application.

The shaft connection 2 has particularly good crash properties due to the design with axial connection section 10 formed therein. Overall, the shaft connection 2 can absorb relatively high axial forces without damage, wherein, with regard to the transmittable forces, at least partially a functional separation between the forces effective in the circumferential direction and the forces effective in the axial direction is provided. The toothing section 6, 8 serves substantially for transmitting torque, i.e. it effects a form-fitting connection in the circumferential direction, while the holding section 9, 10 substantially forms a form-fitting axial connection.

In the following, the special features of the individual exemplary embodiments are explained in greater detail using FIGS. 1 to 16.

Figure 1B:
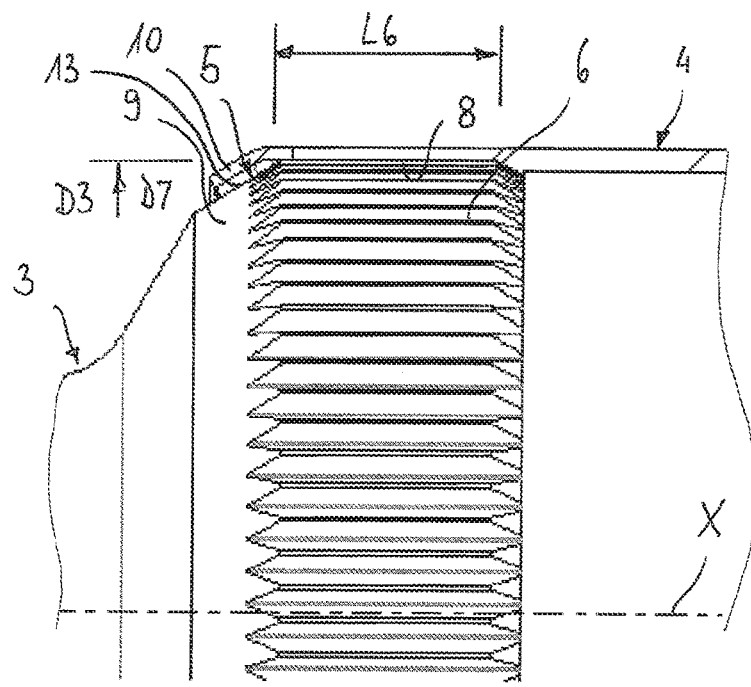
FIG. 1B: a detail of the shaft connection from FIG. 1A in an enlarged view.

In the shaft assembly 2 according to FIGS. 1A and 1B, the axial connecting portion 10 of the shaft tube 4 is formed by a tube end 12 beaded radially inwardly. The axial connecting portion 10 is supported against the diameter-reduced portion 9 of the connecting element 3, which in this embodiment is formed by a conical support surface that axially adjoins the toothing 6. When axial tensile forces occur on the shaft assembly, for example as a result of a smaller impact of the motor vehicle with a forwardly swinging motor-transmission unit, the inwardly formed end portion 12 can, in interaction with the support surface 9, absorb certain axial forces non-destructively.

It can be seen that the shaft tube 4, in a tube portion 14 adjacent to the connecting portion 7, has a substantially constant diameter. The tube portion 14 of the same diameter may extend, for example, over a length of at least one time or multiple times the diameter of the connecting portion 7, optionally over the entire length of the shaft tube 4. The connecting element 3 connected to the shaft tube 4 is designed as a shaft journal that comprises shaft splines 11 at the end opposite the connecting portion 5 for connection to another drive component.

When axial compressive forces occur, for example as a result of a greater impact of the motor vehicle with the distance between the engine and the rear axle differential being shortened, the connecting element 3 with its outer toothing 6 is pushed further into the shaft tube 4, so that a corresponding inner toothing is produced and/or formed into the shaft tube 4 thereby absorbing deformation energy.

Figure 2A:
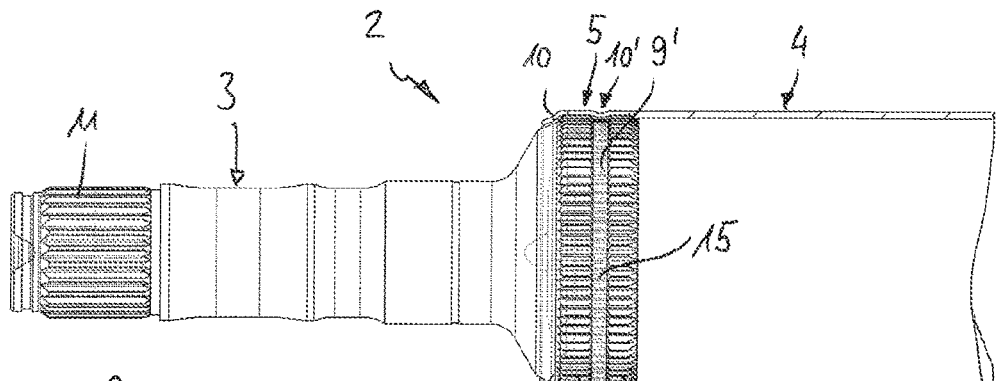
FIG. 2A: a shaft connection in a second embodiment in a partial longitudinal section.
Figure 2B:
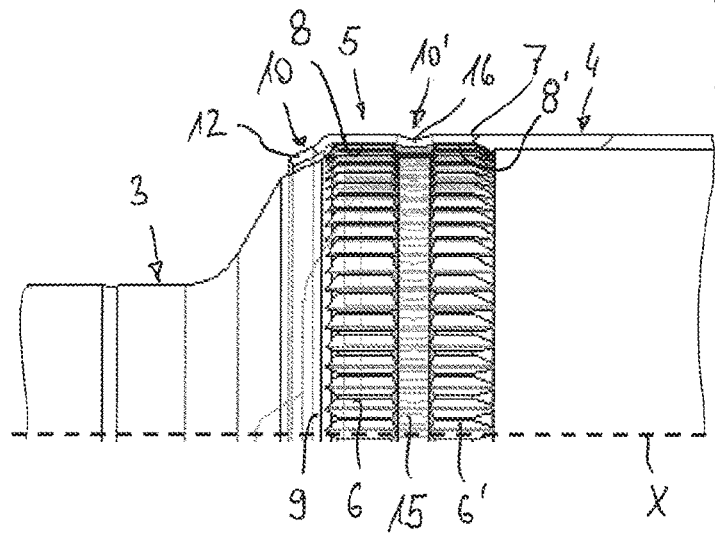
FIG. 2B: a detail of the shaft connection from FIG. 2A in an enlarged view.

The shaft assembly 2 according to FIGS. 2A and 2B largely corresponds to the embodiment according to FIG. 1, so that reference is made to the description above with regard to the common features. The same or modified details are provided with the same reference signs as in FIG. 1. The only difference of the present design according to FIG. 2 is that two axially adjacent toothing sections are provided. For this, the connecting element 3 has two toothing portions 6, 6', between which a circumferential annular groove 15 is formed. The shaft tube 4 has an inwardly flanged end portion 12, which forms a first axial securing portion 10, and a tube portion 16 formed into the annular groove 15, which forms a second axial securing portion 10'. This design with two radially inwardly formed portions 12, 16 is particularly robust with regard to the absorption of axial forces. In particular, axial forces can be absorbed in both directions, i.e., towards and away from each other up to a defined value.

Figure 3A:
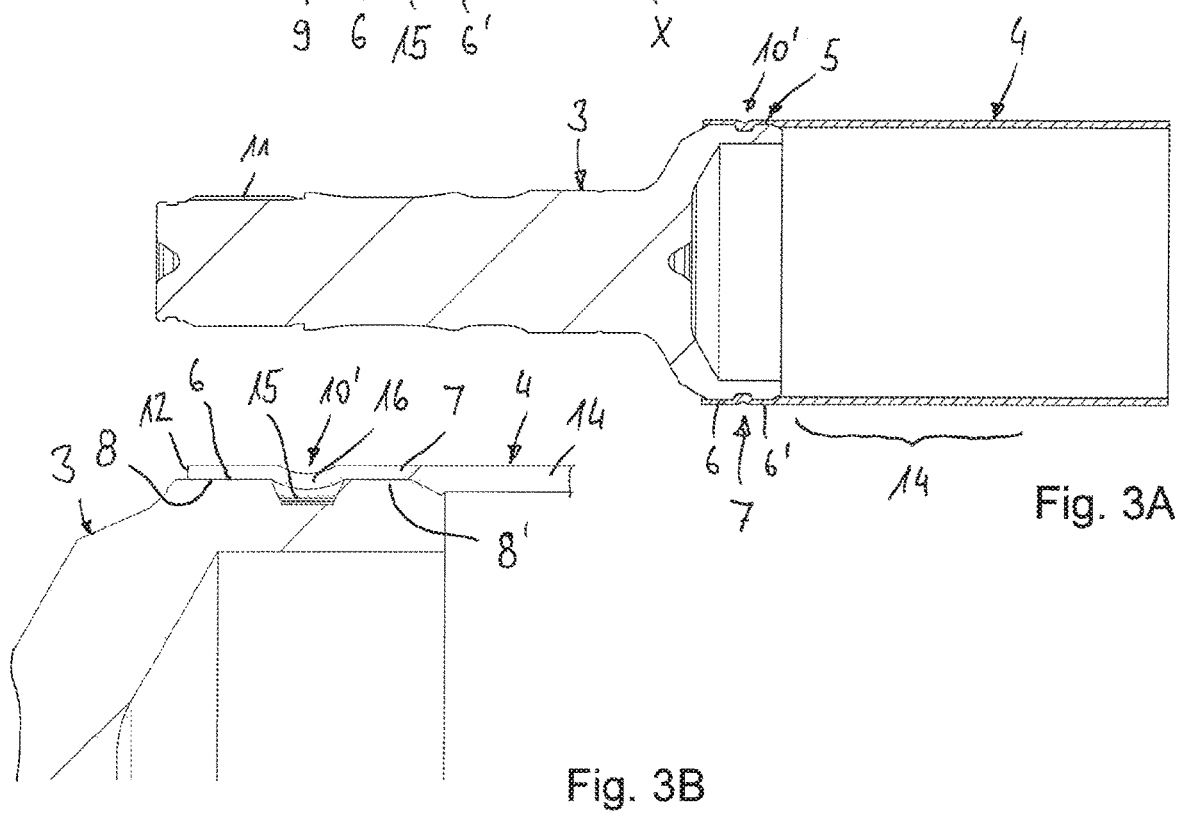
FIG. 3A: a shaft connection in a modified further embodiment in a longitudinal section.
Figure 3B:
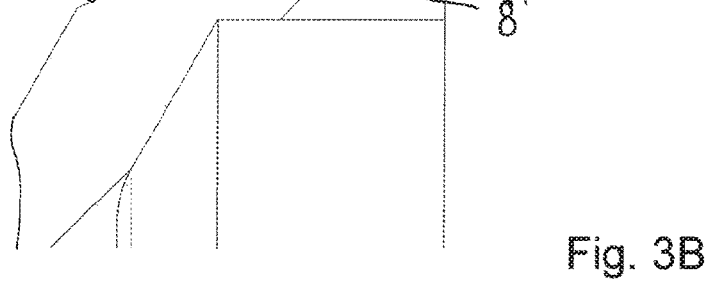
FIG. 3B: a detail of the shaft connection from FIG. 3A in an enlarged view.

The shaft assembly 2 according to FIGS. 3A and 3B corresponds to a large extent to the embodiment according to FIGS. 2A and 2B, so that reference is made to the above description with regard to the similarities. The same or modified details respectively are provided with the same reference signs as in FIGS. 1 and 2. The only difference between the present design according to FIG. 3 and that according to FIG. 2 is that the tube end 12 of the shaft tube 4 is arranged in the area of the toothing 6, i.e., has no flanged end portion. In all other respects, the shaft connection according to FIG. 3 corresponds to the shaft connection above, whose description it is here referred to in abbreviated form.

Figure 4:
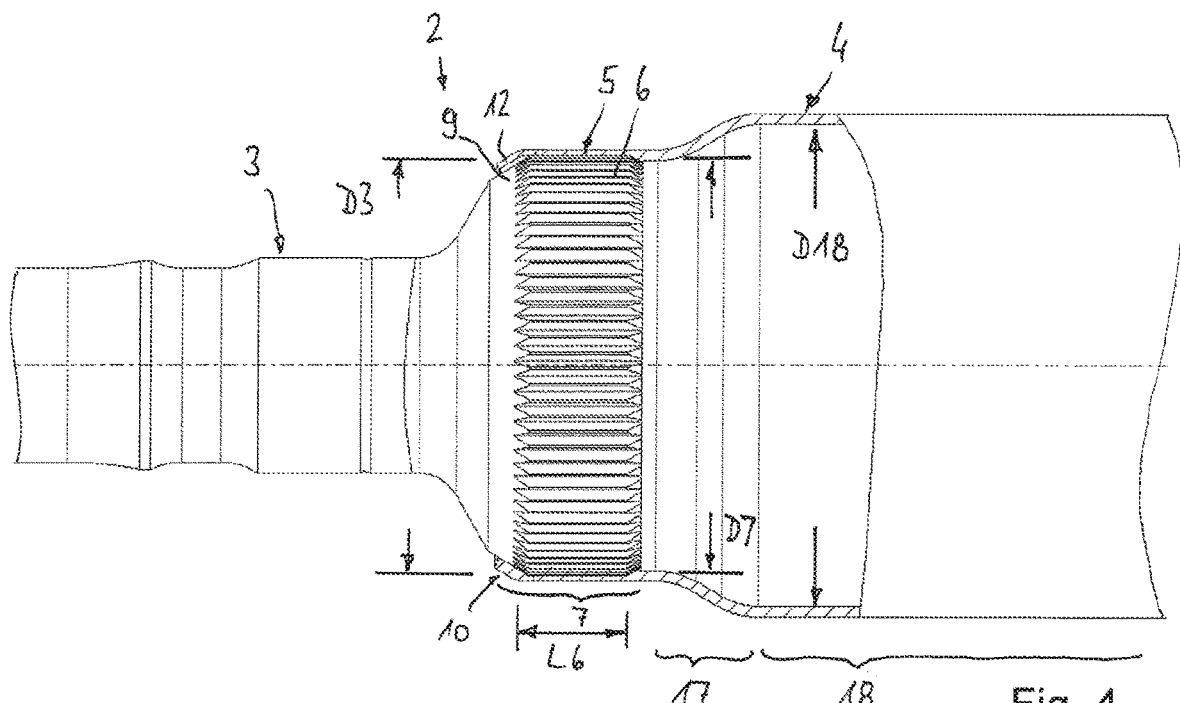
FIG. 4: a shaft connection in a further embodiment in a partial longitudinal section.

The shaft assembly 2 according to FIG. 4 largely corresponds to the embodiment according to FIG. 1, so that reference is made to the description above with regard to the similarities. The same or modified details respectively are provided with the same reference signs as in FIG. 1. The only difference of the present design according to FIG. 4 is that the shaft tube 4 has, adjacent to the connecting portion 7, a transition portion 17 with a diameter widening along the length, as well as a tube portion 18 with a constant diameter adjoining the transition portion 17. The inner diameter D18 of the tube portion 18 is larger than the outer diameter D3 of the connecting element 3, and/or of the toothing 6, in particular larger than 1.1 times the outer diameter D3. In the present design with stepped shaft tube 4, when the shaft connection 2 is shortened due to an accident, the connecting element 3 initially pushes through the connecting portion 7 and increasingly further into the transition section 17. When plunging into the transition portion 17, the outer toothing 6 of the connecting element 3 increasingly disengages from the inner toothing 8 of the shaft tube 4. Accordingly, when the shaft connection 2 is shortened axially, the axial displacement force also decreases over the displacement path. When the outer toothing 6 of the connecting element 3 has completely penetrated through the connecting portion 7, i.e., has completely moved into the transition portion 17, and/or the tube section 18 with a larger diameter, the axial force drops to zero, so that the connecting element 3 is further pushed into the shaft tube 4 in a substantially force-free manner.

Figure 5A:
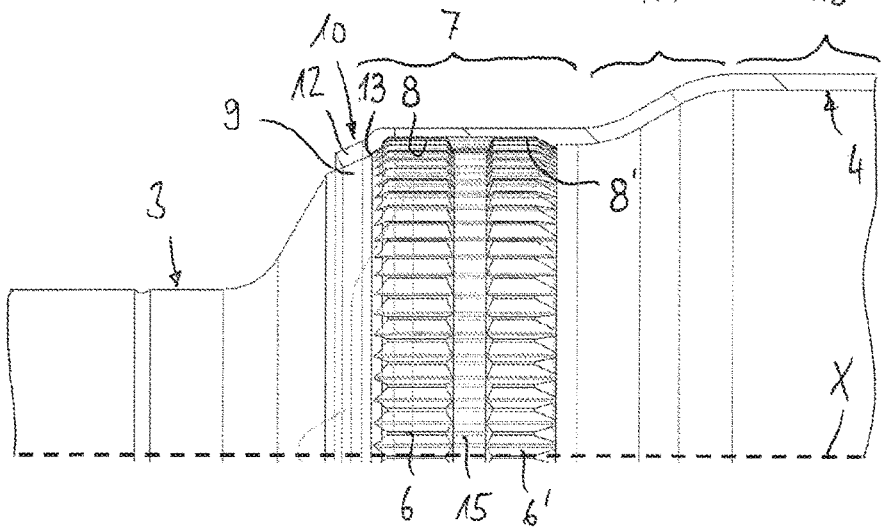
FIG. 5A: a shaft connection in a modified further embodiment in a semi-longitudinal section.

The shaft assembly 2 according to FIG. 5A is substantially a combination of the embodiment according to FIG. 4 and that according to FIG. 2, to whose description reference is made in this respect. Same or modified details respectively are provided with the same reference signs as in the Figures mentioned. The end portion 12 of the shaft tube 4 is formed radially inwardly and is supported against the supporting face 13 of the connecting element 3. The shaft tube 4 is designed as a stepped tube with a connecting portion 7 of smaller diameter and a tube section 18 of larger diameter D18. The shaft tube 4 has a constant diameter in the axial overlap area with the annular groove 15. However, it is to be understood that the shaft tube 4 can also be formed radially inwardly in the axial overlap area with the annular groove, so that a form-fitting axial connection is provided. In this case, the axial connecting means are effective in both axial directions with greater force.

Figure 5B:
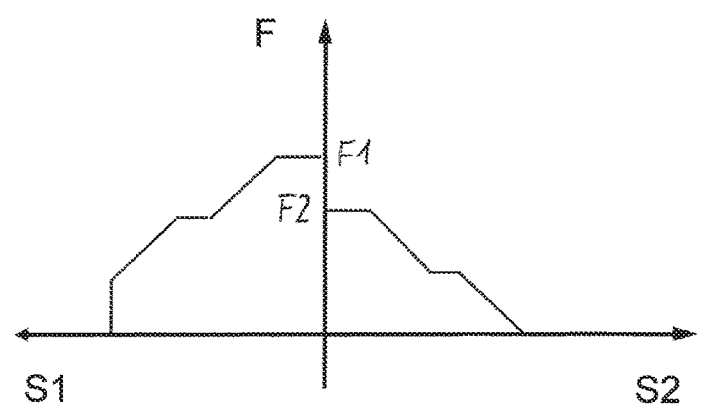
FIG. 5B: a force-path diagram of the shaft connection according to FIG. 5A.

FIG. 5B shows a force-displacement diagram of the shaft connection 2 according to FIG. 5A, namely for an extension 51 of the shaft connection due to axial tensile forces acting between the connecting element 3 and the shaft tube 4, and for a shortening S2 of the shaft connection due to axial compressive forces acting between the connecting element 3 and the shaft tube 4.

In the event that the axial holding force F1 of the shaft connection is exceeded in the direction of tension 51, for example as a result of an accident with the motor-transmission unit swinging forwards, the connecting element 3 can be pulled out of the shaft tube 4 over a limited path. The shaft connection 2 withstands axial forces without destruction up to the holding force F1 is reached, which can also be referred to as the activation force. However, if the holding force F1 is exceeded, the toothing section 5 of the connecting element 3 is pulled out of the connecting portion 7 of the shaft tube 4, wherein the beaded axial securing portion 10 is widened. When the first toothing 6 moves out of the tube end 12, the axial retaining force decreases progressively, in the area of the groove 15 the axial force remains the same, and further decreases with the second toothing 6' moving out of the tube end 12, until the toothing portion 5 of the connecting element 3 is completely pulled out of the shaft tube 4.

In the opposite load case, i.e. occurrence of axial forces in compressive direction S2, the shaft connection 2 can withstand corresponding holding forces F2 which are greater than the holding force F1. This is due to the fact that less deformation work is absorbed during plunging-in than during pulling-out described above, where accordingly the axial securing portion 10 must be overcome. If the axial force caused by an accident between the connecting element 3 and the shaft tube 4 exceeds the holding force F2, for example due to an accident with a compressed vehicle body, the connecting element 3 and the shaft tube 4 move telescopically into each other. The connecting element 3 with its outer toothing 6 is pushed further into the shaft tube 4 so that a corresponding inner toothing is created, and/or formed into the tube portion with constant diameter, thereby absorbing deformation energy. When the shaft-side toothing 6' moves into the extended tube portion 17, the toothing force decreases increasingly, in the area of the groove 15 the force remains the same, and further decreases with the entry of the journal-side toothing 6 into the tube section 17, until the toothing portion 5 of the connecting element 3 is completely driven into the extended tube portion 17.

Figure 6A:
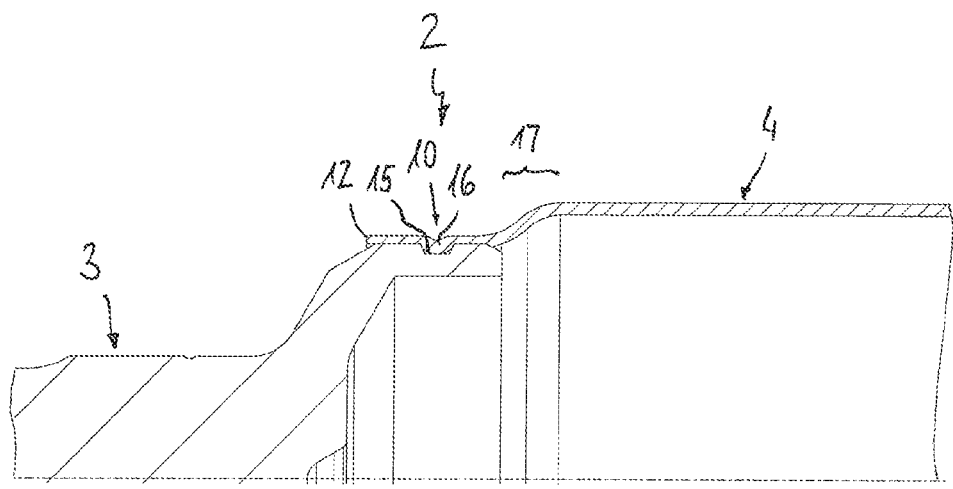
FIG. 6A: a shaft connection in a further embodiment in a semi-longitudinal section.
Figure 6B:
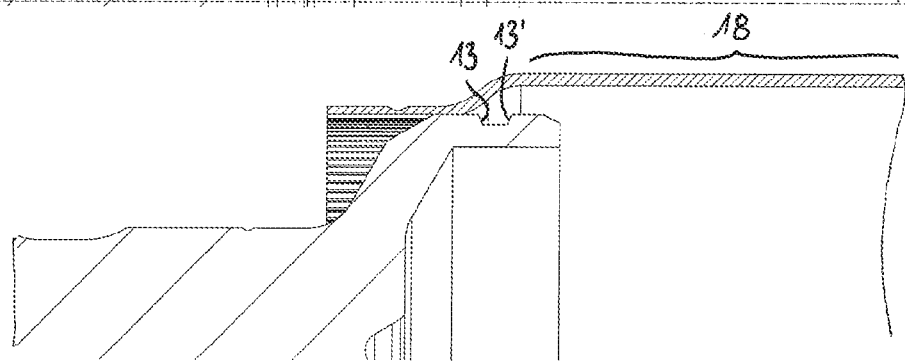
FIG. 6B: the shaft connection from FIG. 6A being pushed into each other due to a crash, in a first sliding position.
Figure 6C:
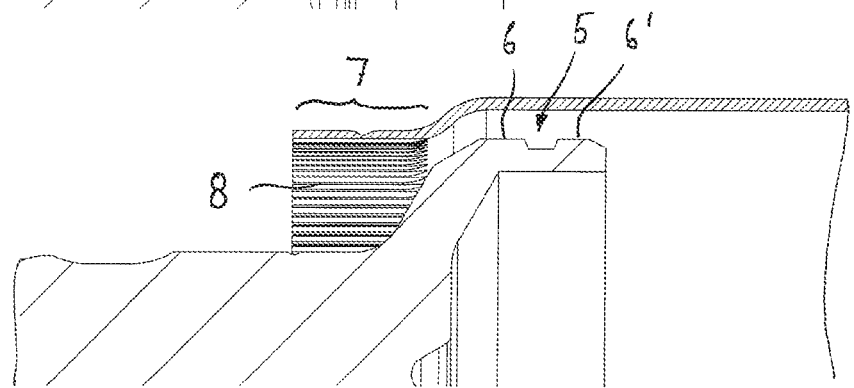
FIG. 6C: the shaft connection from FIG. 6A being pushed into each other due to a crash, in a further sliding position.
Figure 6D:
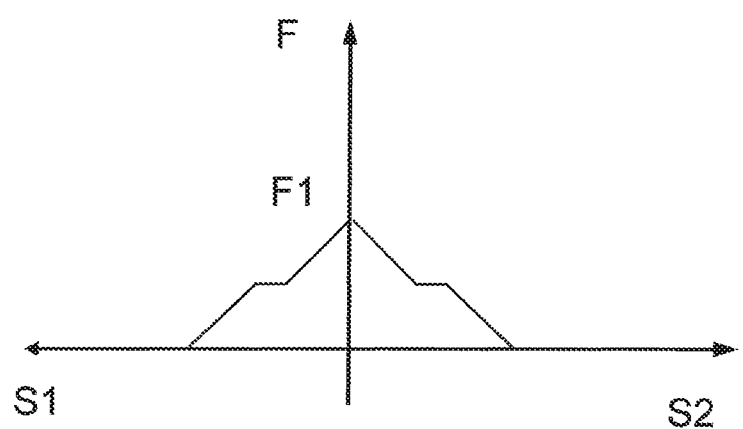
FIG. 6D: a force-path diagram of the shaft connection according to FIG. 6A.

FIGS. 6A to 6D are described together below. There is a shaft assembly 2 in another embodiment in different conditions (FIGS. 6A-6C) and a corresponding force-displacement diagram shown (FIG. 6D). This embodiment largely corresponds to that of FIG. 3, to whose description abbreviated reference is made. The same or modified details respectively are provided with the same reference signs as in FIG. 3 or the other Figures. The only difference between the present design according to FIG. 6 and that according to FIG. 3 is that a stepped shaft tube 4 is used, as shown in FIG. 4, for example, to whose description abbreviated reference is made here. The tube end 12 of the shaft tube 4 is arranged in the area of the toothing 6, i.e., it has no flanging at the end. The axial securing 10' is provided by forming-in the tube section 16 into the annular groove 15.

In the present embodiment, the force-path course of driving into each other and/or moving apart is symmetric. The holding force F1 is essentially formed by the interlocking engagement of the tube section 16 in the annular groove 15. After overcoming the holding force, the connecting element 3 and the shaft tube 4 move telescopically into each other or apart. The connecting element 3 with its outer toothing 6 is pushed in and/or pulled out from the connecting portion 7 of the shaft tube 4, wherein the holding force over the displacement path decreases accordingly, remains the same in the region of the groove 15, and then drops further in the other toothing section until the toothing portion 5 of the connecting element 3 is completely moved out of the connecting portion 7 of the shaft tube 4.

Figure 7A:
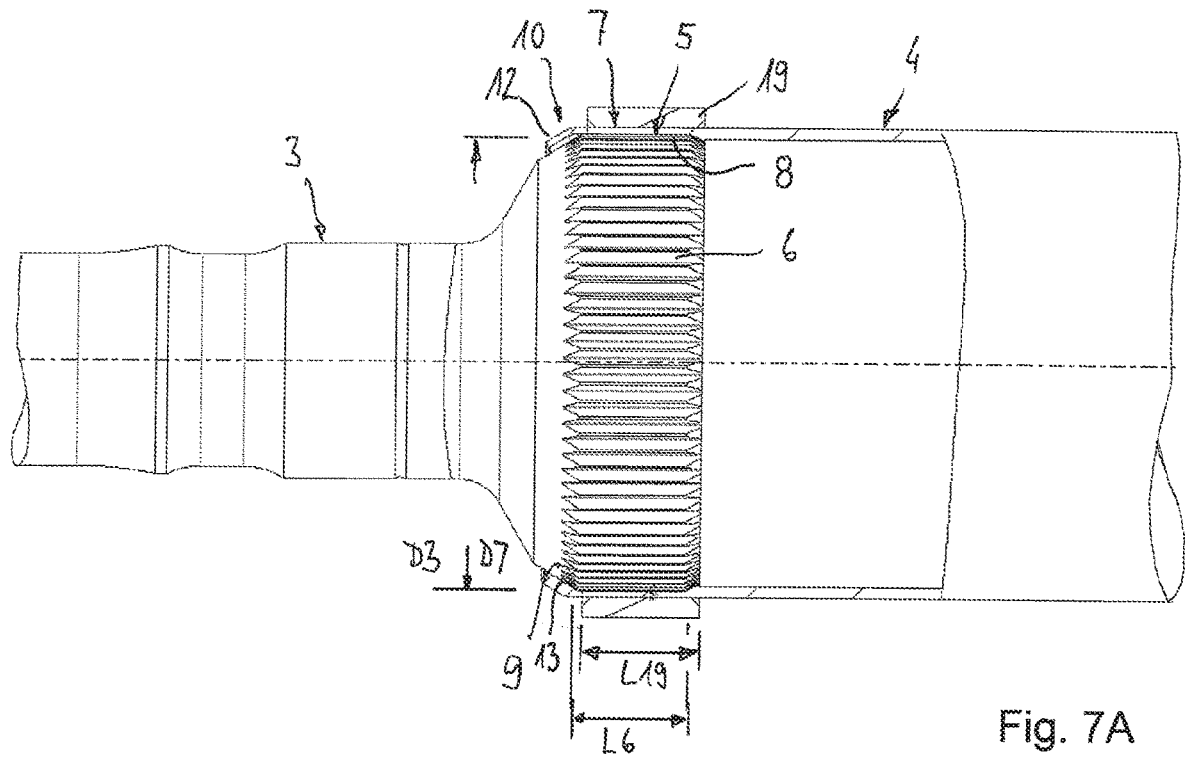
FIG. 7A: a shaft connection in a further embodiment in a partial longitudinal section.
Figure 7B:
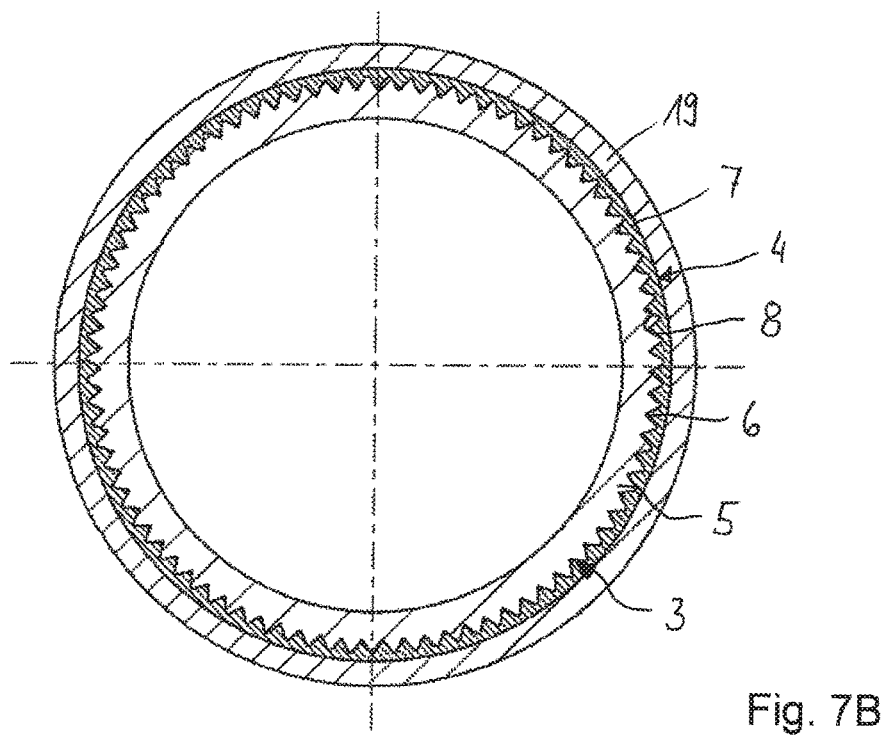
FIG. 7B: the shaft connection in a cross-section according to section line VII-VII from FIG. 7A.

FIGS. 7A and 7B show a shaft assembly 2 in another embodiment. This largely corresponds to that according to FIG. 1, which is thus referred to in abbreviated form. The same or modified details respectively are provided with the same reference signs as in FIG. 1. The only difference of the present design according to FIG. 7 is that the shaft connection 2 has a reinforcing ring 19 which is pushed onto the shaft tube 4 and arranged in the overlap area with the connection. The axial length L19 of the reinforcing ring 19 amounts approximately to the axial length of the toothing 6 of the connecting element 3 and lies in particular between 0.8 and 1.2 times the toothing length. The reinforcing ring 19 is preferably pushed onto the connecting section of the shaft tube 4 before the connecting element 3 is pressed in. The reinforcing ring 19, which can also be referred to as armor-ring, achieves a particularly robust connection between the connecting element 3 and shaft tube 4, so that particularly high forces and torques can be transmitted. The end portion 12 of the shaft tube 4 is beaded inwardly so that additional protection against axial tensile forces is provided between the connecting element 3 and the shaft tube 4.

Figure 8A:
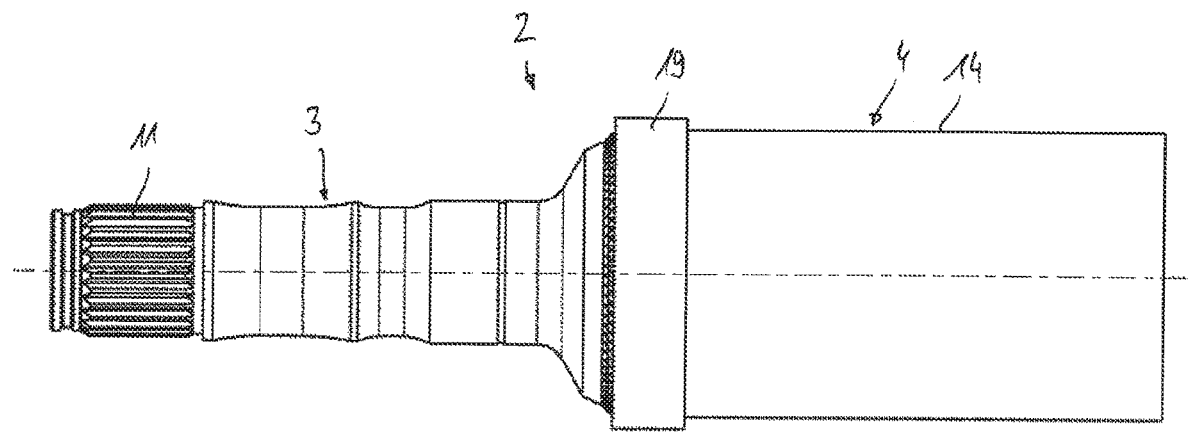
FIG. 8A: a shaft connection in a further embodiment in a side view.
Figure 8B:
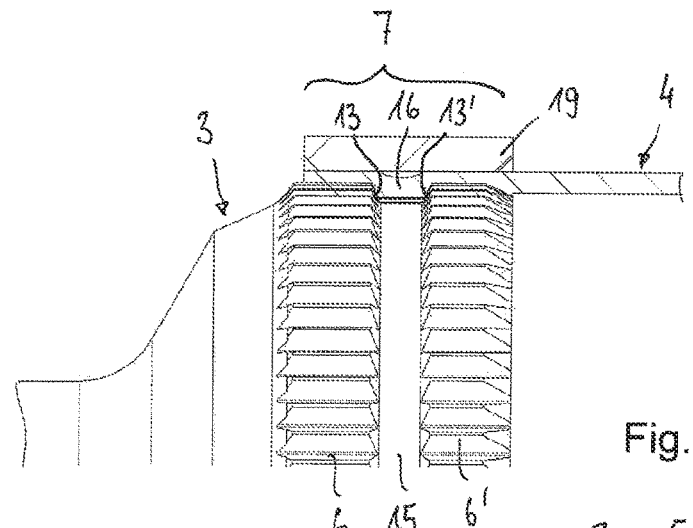
FIG. 8B: the connection area of the shaft connection from FIG. 8A as a detail in a partial longitudinal section.

The shaft assembly 2 according to FIGS. 8A and 8B is substantially a combination of the embodiment according to FIG. 3 and the embodiment according to FIG. 7. In this respect, abbreviated reference is made to the above description with regard to the corresponding similarities. The same or modified details respectively are provided with the same reference signs as in the Figures mentioned. It can be seen that the axial end 12 of the shaft tube 4 is arranged in the section of the toothing 6, i.e., the shaft tube 4 has no flanged end portion. The connecting element 3 has two toothing portions 6, 6', between which a circumferential annular groove 15 is formed. In the axial overlap area with the annular groove 15, the shaft tube 4 has an inwardly formed tube portion 16, so that a form-fitting axial securing 10 is provided. In addition, a reinforcing ring 19 is provided which is arranged in the axial overlap area of the toothing connection. The shaft tube 4 has a constant diameter, at least in the connecting portion 7 and the axially adjoining tube section 14.

Figure 9:
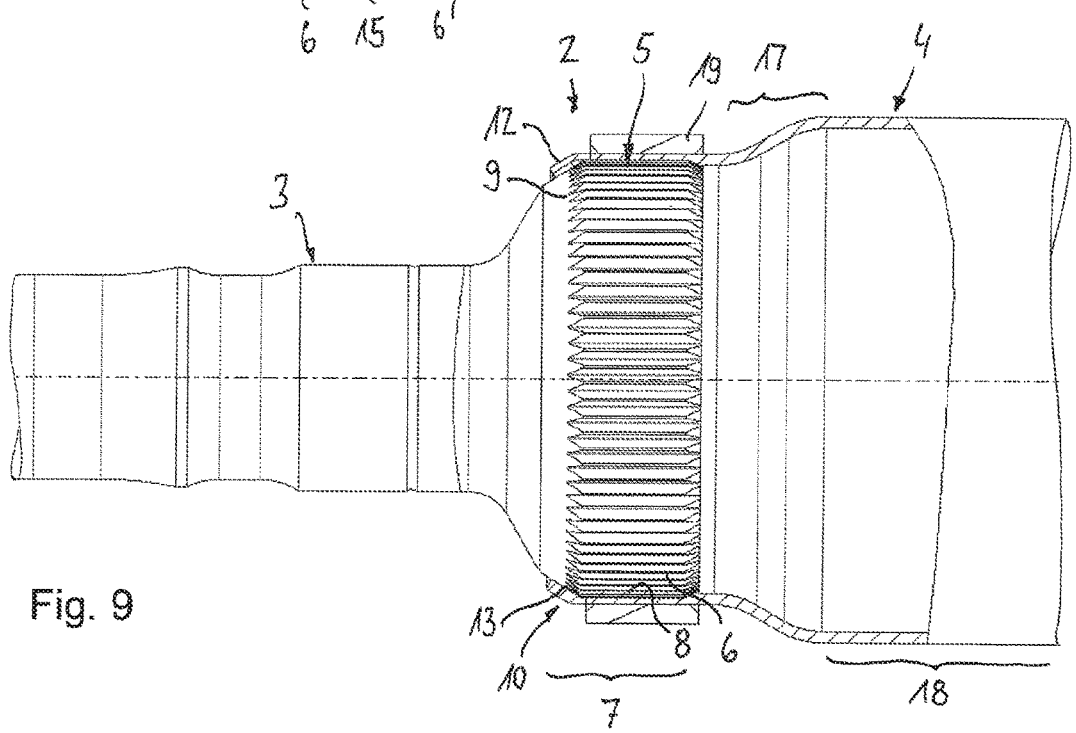
FIG. 9: a shaft connection in a further embodiment in a partial longitudinal section.

FIG. 9 shows a shaft assembly 2 in another embodiment. This corresponds to a combination of the embodiment according to FIG. 4 and that according to FIG. 7, whose description is thus referred to in abbreviated form. The same or modified details are provided with the same reference signs as in the Figures mentioned. The present shaft connection 2 is designed as shown in FIG. 4 and additionally has a reinforcing ring 19, as shown in FIG. 7, which is pushed onto the shaft tube 4 and arranged in the overlap area with the connecting portion 7.

Figure 10A:
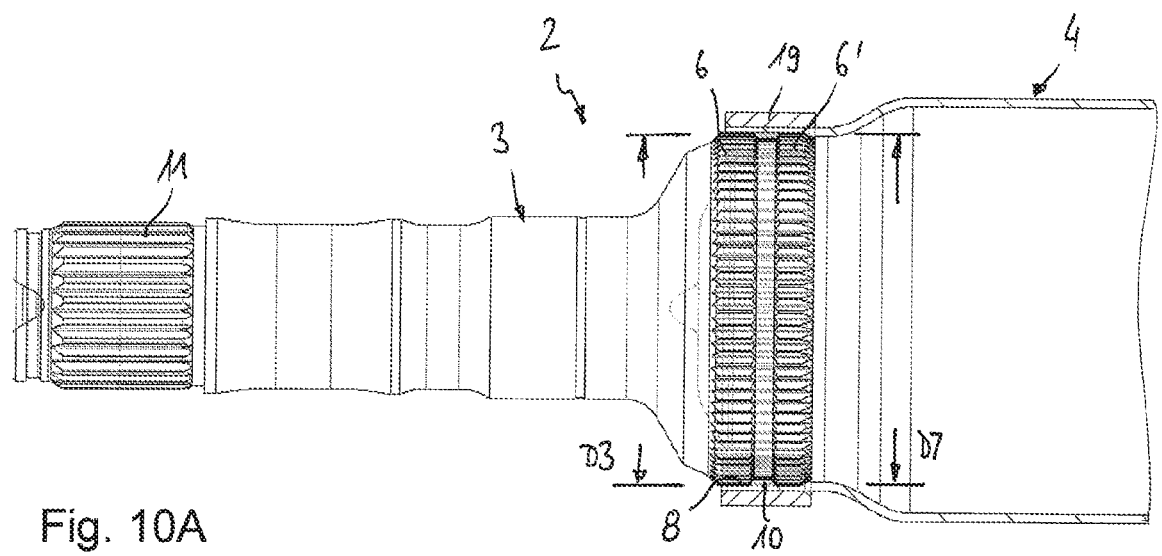
FIG. 10A: a shaft connection in a further embodiment in a partial longitudinal section.
Figure 10B:
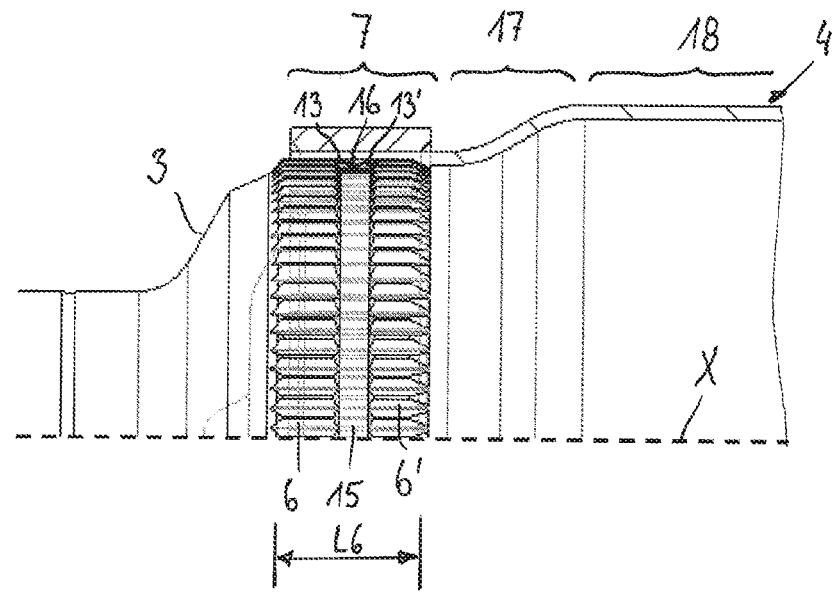
FIG. 10B: the connection area of the shaft connection from FIG. 10A in an enlarged view.
Figure 10C:
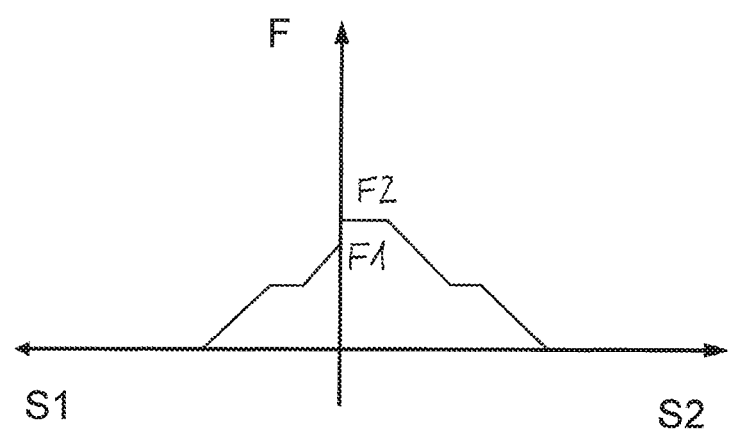
FIG. 10C: a force-path diagram of the shaft connection according to FIG. 10A.

The FIGS. 10A to 10C are described together below. A shaft assembly 2 in a further embodiment (FIGS. 10A, 10B) and a corresponding force-displacement diagram (FIG. 10O) are shown. The shaft assembly 2 according to FIG. 10 is substantially a combination of the embodiment according to FIG. 6 with the embodiment according to FIG. 7, the description of which is abbreviated in this respect. The same or modified details are provided with the same reference signs as in the Figures mentioned. The present shaft connection 2 is designed like the one shown in FIG. 6 and additionally has a reinforcing ring 19, as shown in FIG. 7, which is pushed onto the shaft tube 4 and arranged in the overlap area with the connecting portion 7. Before the reinforcing ring 19 is mounted, the ring portion 16 of the shaft tube 4 is formed into the groove 15 of the connecting element 3 so that an interlocking axial connection is provided.

The force-displacement diagram for the shaft connection 2 according to FIG. 10C is different from that for the embodiment according to FIG. 6 in that the holding force F1 is lower for axial tensile forces than the holding force F2 for compressive forces. The reason for this is that, when plunging-in, a higher deformation energy has to be applied due to the toothing to be formed into the shaft tube 4.

Figure 11:
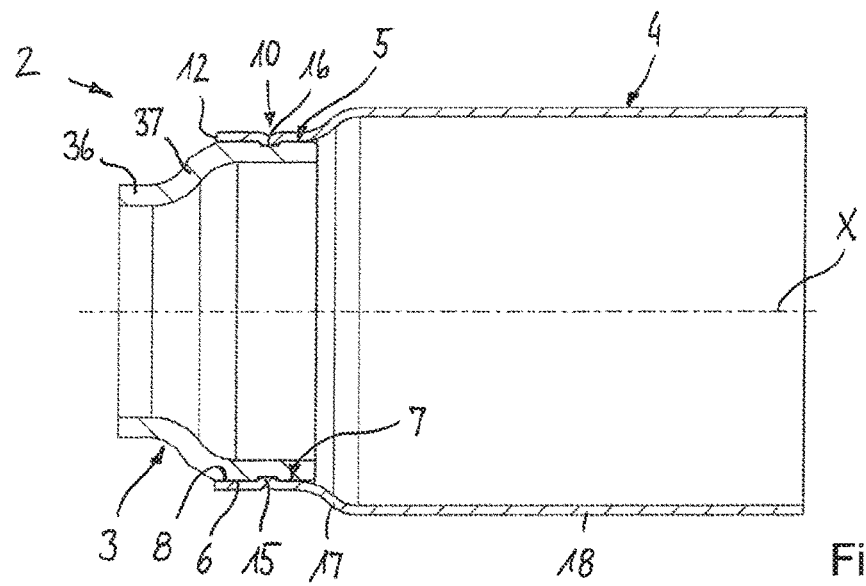
FIG. 11: a shaft connection in a further embodiment in a longitudinal section.

FIG. 11 shows a shaft assembly 2 in another embodiment. This largely corresponds to the embodiment according to FIG. 6, to whose description abbreviated reference is made. The same or modified details are provided with the same reference signs as in the Figures above. The present shaft connection 2 is characterised in that the connecting element 3 is designed as an adapter element. It can be seen that the adapter element has a greater wall thickness than the shaft tube 4. The connecting portion 5, which is externally toothed as in the embodiment according to FIG. 6, has a larger diameter than an opposite end portion 36 of the adapter element 3. Between the end portion 36 and the connecting portion 5 an intermediate portion 37 is formed with a variable diameter over the length. Apart from that, the present embodiment corresponds to that of FIG. 6, to whose description reference is thus made.

Figure 12:
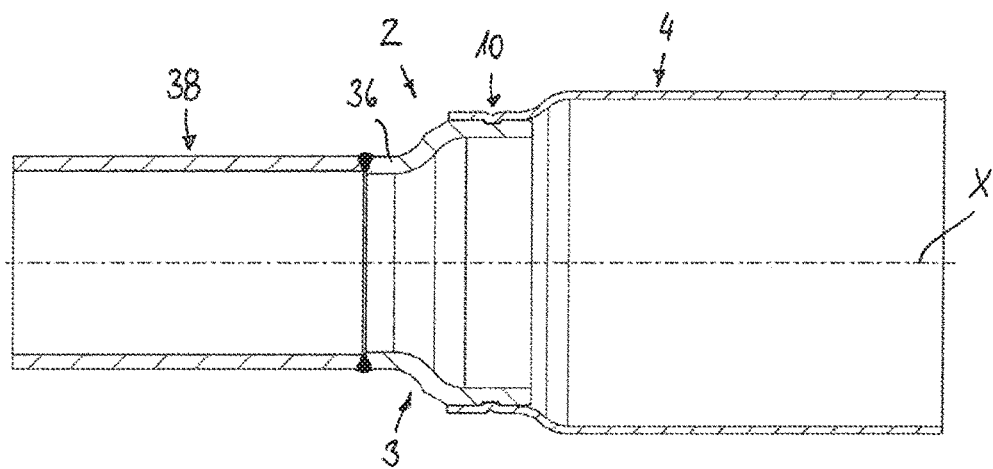
FIG. 12: the shaft connection of FIG. 11 with a connection tube in a longitudinal section.

FIG. 12 shows the shaft assembly 2 from FIG. 11 with a welded shaft tube 38. The shaft tube 38 has a smaller diameter and a larger wall thickness than the shaft tube 4. The diameter and the wall thickness correspond at least approximately to those of the adapter element 3.

Figure 13:
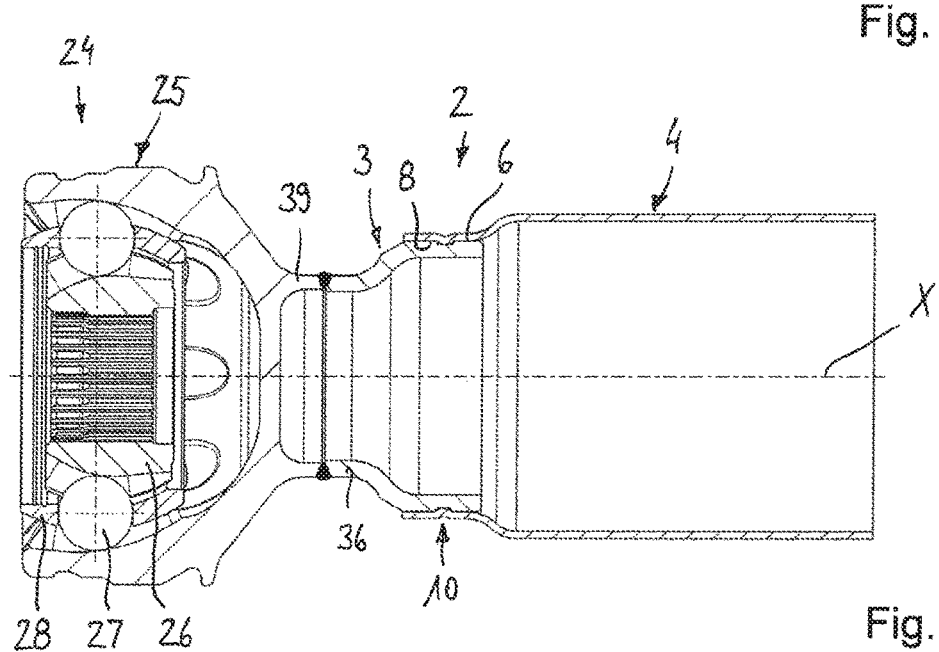
FIG. 13: the shaft connection of FIG. 11 with a constant velocity joint in a longitudinal section.

FIG. 13 shows the shaft assembly 2 from FIG. 11 with a constant velocity joint 24 connected thereto. Specifically, the adapter element 3 is welded to the outer joint part 25 of the constant velocity joint 24, which has a corresponding formed-on sleeve projection 39. The constant velocity joint 24 also comprises an inner joint part 26, torque transmitting balls 27 each guided in a pair of opposite outer ball tracks and inner ball tracks, and a ball cage 28 holding the balls in one plane.

Figure 14:
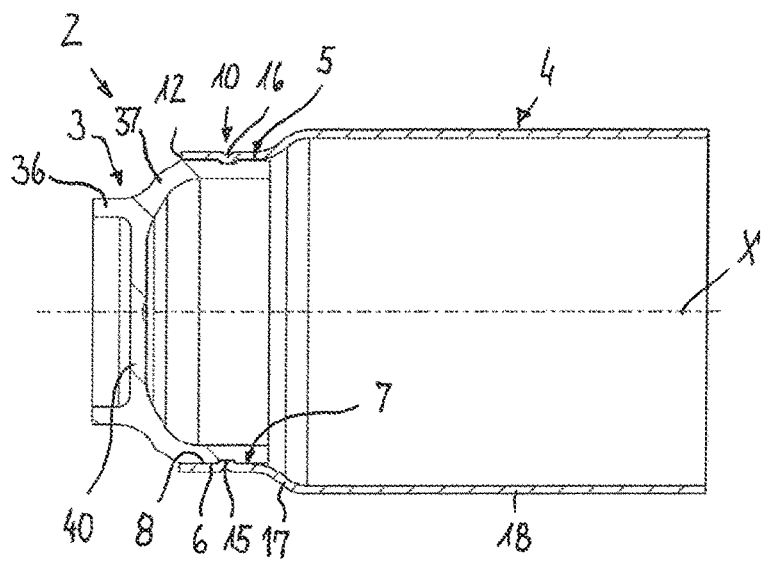
FIG. 14: a shaft connection in another embodiment in a longitudinal section.

FIG. 14 shows a shaft assembly 2 in another embodiment. This largely corresponds to the embodiment according to FIG. 11, whose description it is thus referred to in an abbreviated manner. The same or modified details are provided with the same reference signs as in the Figures above. The present shaft connection 2 is characterized in that the connecting element 3 is designed as an adapter element with a closed bottom 40, which is arranged between the end portion 36 and the connecting portion 5.

Figure 15:
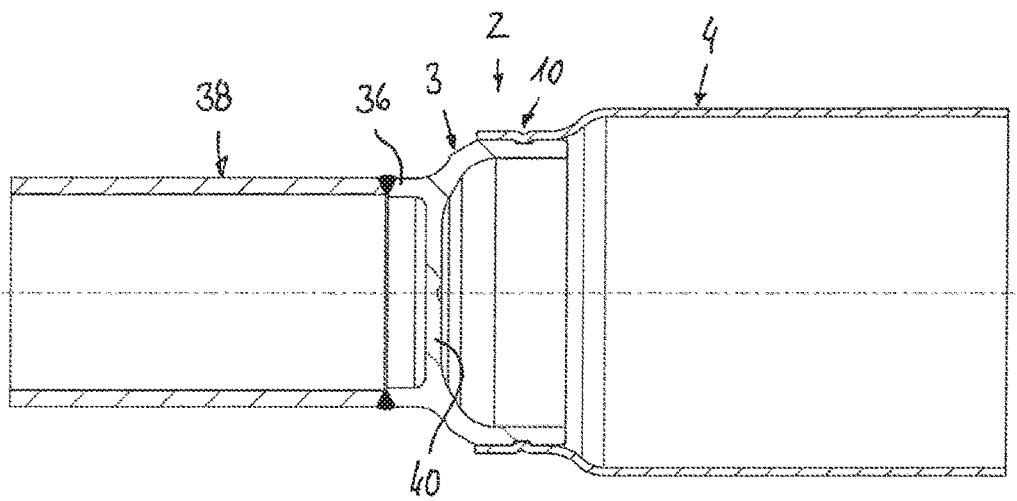
FIG. 15: the shaft connection of FIG. 14 with a connection tube in a longitudinal section.

FIG. 15 shows the shaft assembly 2 from FIG. 14 with a welded-on shaft tube 38. The shaft tube 38 has a smaller diameter and a larger wall thickness than the shaft tube 4. The diameter and the wall thickness correspond at least approximately to those of the adapter element 3.

Figure 16:
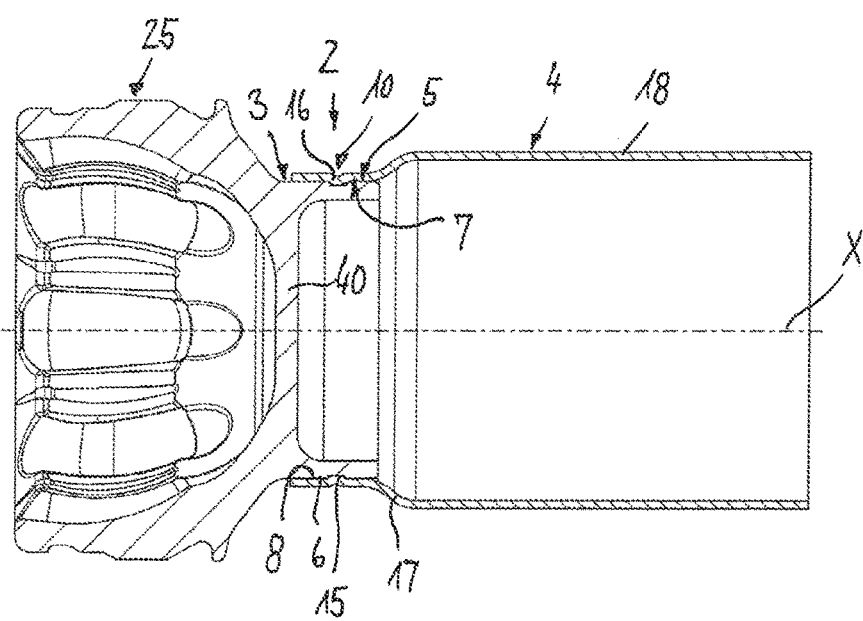
FIG. 16: a shaft connection in another embodiment in a longitudinal section.

FIG. 16 shows a shaft assembly 2 in another embodiment. This corresponds to a large extent to the embodiment according to FIG. 6 and FIG. 13, respectively, to whose description it is thus abbreviatedly referred to. The same or modified details are provided with the same reference signs as in the Figures above. The present shaft connection 2 is characterised in that the connecting element 3 is an integrally formed-on connecting journal of an outer joint part 25. The outer joint part 25 has a bottom 40 from which the connecting journal extends axially as a hollow journal.

Figure 17:
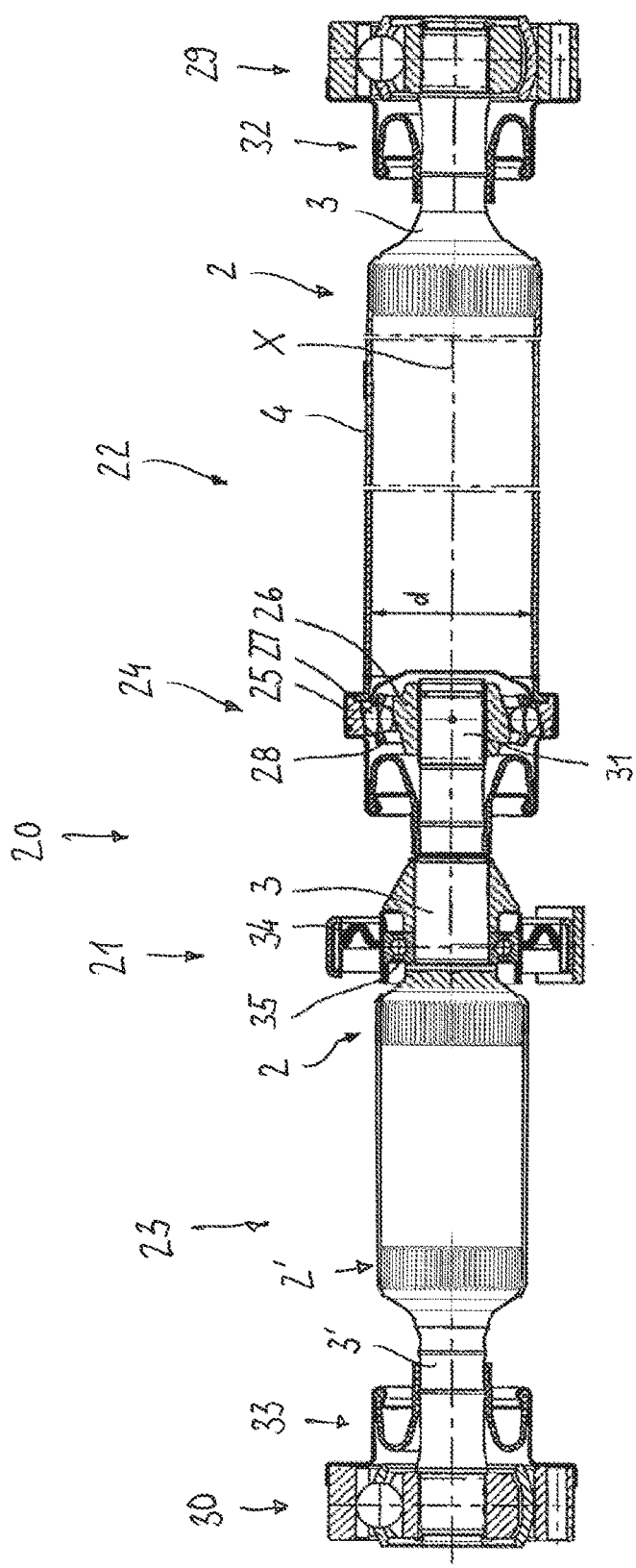
FIG. 17: a shaft assembly with a shaft connection according to the invention according to FIG. 1 in a longitudinal section.

FIG. 17 shows a drive shaft 20 with an intermediate bearing 21, such as used for example in the driveline of a motor vehicle to transmit torque from the multi-step transmission to the axle differential in an aligned condition relative to the longitudinal axis X. The drive shaft 20 is designed in several parts and comprises a first shaft portion 22 and a second shaft portion 23, which are connected to each other by means of a rotary joint 24. The rotary joint 24 is in the form of a constant velocity joint and has an outer joint part 25 with outer ball tracks, an inner joint part 26 with inner ball tracks, torque transmitting balls 27 each guided in a pair of opposing outer ball tracks and inner ball tracks, as well as a ball cage 28 holding the balls in the angle-bisecting plane.

The first shaft portion 22 comprises a shaft connection 2 according to FIG. 1, the shaft tube 4 of which is connected to the outer joint part 6 of the constant velocity joint 24, and the shaft journal 3 of which is connected to the inner joint part of an end-side constant velocity joint 29. The second shaft portion 23 comprises two shaft connections 2, 2' according to FIG. 1, wherein the shaft tube 4 is on both sides connected to a respective shaft journal 3, 3'. The connecting portion 31 of the central shaft journal 3 is connected in a rotationally fixed manner to the inner joint part 26 of the central constant velocity joint 24, while the end-side shaft journal 3' is connected to the inner joint part of an end-side constant velocity joint 30.

The end-side constant velocity joints 29, 30 are in the form of plunging joints, which are used for connection to a multi-step transmission (not shown) or to an axle differential (not shown) of the motor vehicle. The plunging joints are sealed against the environment by sealing arrangements 32, 33.

The intermediate bearing 21 with damping member 34 is arranged axially adjacent to the central constant velocity joint 24, in which intermediate bearing the drive shaft 20 is connected to the vehicle body. The drive shaft 20 is rotatably supported by means of a rolling bearing 35 which is mounted on a bearing section of the central shaft journal 3.

LIST OF REFERENCE SIGNS 2 shaft connection
3 connecting element
4 shaft tube
5 flange portion
6 outer toothing
7 flange portion
8 counter toothing
9 section
10 axial connecting portion
11 shaft spline
12 end portion
13 supporting face
14 end section
15 annular groove
16 tube section
17 transition section
18 tube section
19 reinforcing ring
20 drive shaft
21 intermediate bearing
22 first shaft portion
23 second shaft portion
24 constant velocity joint
25 outer joint part
26 inner joint part
27 balls
28 ball cage
29 constant velocity joint
30 constant velocity joint
31 connecting portion
32 sealing arrangement
33 sealing arrangement
34 damping member
35 rolling bearing
36 end portion
37 intermediate portion
38 shaft tube
39 sleeve portion
40 bottom
D diameter
F force
L length
S path
X longitudinal axis

The invention claimed is:

1. A shaft connection, comprising:
 a metal shaft tube; and
 a metal connecting element that includes a connecting portion with an outer toothing that is pressed into a connecting portion of the shaft tube with a press fit, wherein an interlocking connection in a circumferential direction is formed between the shaft tube and the connecting element for transmitting torque, wherein the connecting element comprises a greatest outer diameter in a region of the outer toothing;

wherein the shaft tube comprises an axial connecting section which is formed radially inwardly, relative to the outer toothing, into a diameter-reduced section of the connecting portion, with the axial connecting section of the shaft tube having a smaller diameter than the outer diameter of the connecting element in the region of the outer toothing, such that an interlocking axial connection in an axial direction is formed between the shaft tube and the connecting element for transmitting axial forces;

wherein the interlocking axial connection is configured to absorb axial forces of up to 5 kilo-Newtons (kN) without damage.

2. The shaft connection of claim 1, wherein the interlocking axial connection is effective in two axial directions.

3. The shaft connection of claim 1, wherein the connecting portion comprises two axially adjacent outer toothings, between which a circumferential annular groove is formed, into which annular groove the axial connecting portion of the shaft tube is formed.

4. The shaft connection of claim 3, wherein a width of the annular groove is smaller than respective widths of the two outer toothings.

5. The shaft connection of claim 1, wherein the shaft tube has a constant diameter over a length.

6. The shaft connection of claim 1, wherein the connecting portion of the shaft tube has a smaller diameter than a tube portion of the shaft tube axially spaced from the connecting portion.

7. The shaft connection of claims 1, wherein an outer diameter of the shaft tube is larger than the greatest outer diameter of the connecting element.

8. The shaft connection of claim 1, wherein a strength of the shaft tube is smaller than a strength of the outer toothing.

9. The shaft connection of claim 1, wherein the shaft tube is made of a metal material of less strength than a material of the connecting element, and wherein the connecting element is made of a steel material.

10. The shaft connection of claim 1, wherein the outer toothing of the connecting element and an inner toothing of the shaft tube form an interlocking toothing arrangement that has an average diameter and an axial length, wherein a ratio of the average diameter to the axial length is greater than 2.0.

11. The shaft connection of claim 1, wherein a reinforcing ring is provided externally on the connecting portion of the shaft tube.

12. The shaft connection of claim 1, wherein the connecting element comprises, at an end opposite to the connecting portion, shaft splines insertable into corresponding splines of a connecting component.

13. The shaft connection of claim 1, further comprising, at a second end portion of the shaft tube opposite to the connecting element, a second connecting element fixedly connected to the second end portion of the shaft tube.

* * * * *

UNITED STATES PATENT AND TRADEMARK OFFICE
CERTIFICATE OF CORRECTION

| | | |
|---|---|---|
| PATENT NO. | : 11,384,797 B2 | |
| APPLICATION NO. | : 16/604630 | |
| DATED | : July 12, 2022 | |
| INVENTOR(S) | : Herbert Cermak | |

It is certified that error appears in the above-identified patent and that said Letters Patent is hereby corrected as shown below:

In the Claims

Column 14, in Line 1, in Claim 7, replace "of claims 1, wherein" with -- of claim 1, wherein --.

Signed and Sealed this
Fifteenth Day of November, 2022

Katherine Kelly Vidal
*Director of the United States Patent and Trademark Office*